(Model.)
3 Sheets—Sheet 1.
T. W. MORAN.
STEAM COUPLING FOR STEAM HEATING RAILWAY CARS.
No. 465,873. Patented Dec. 29, 1891.
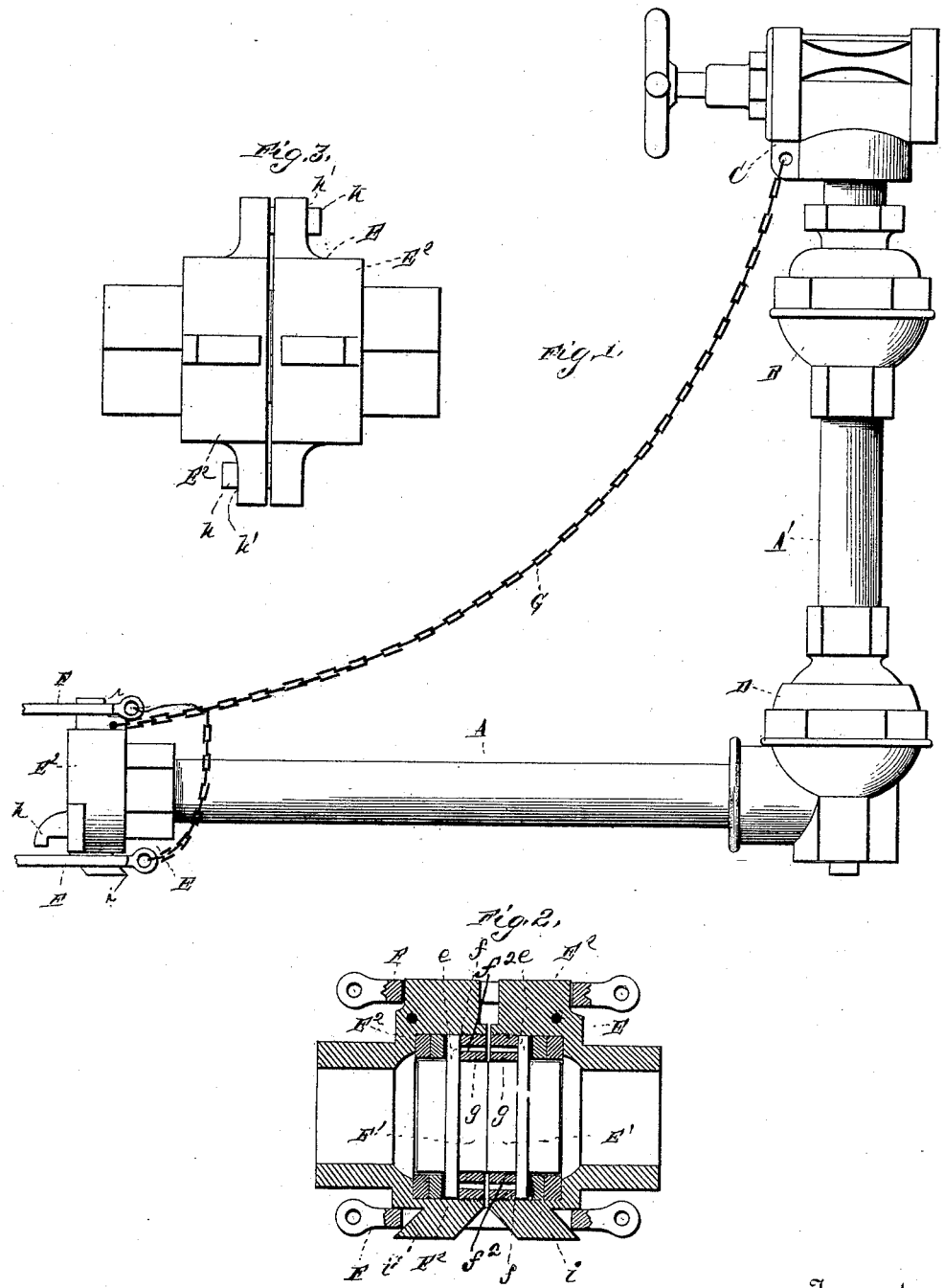
Witnesses
Inventor
T. W. Moran,
by E. W. Anderson
his Attorney (Model.)
3 Sheets—Sheet 2.
T. W. MORAN.
STEAM COUPLING FOR STEAM HEATING RAILWAY CARS.
No. 465,873. Patented Dec. 29, 1891.
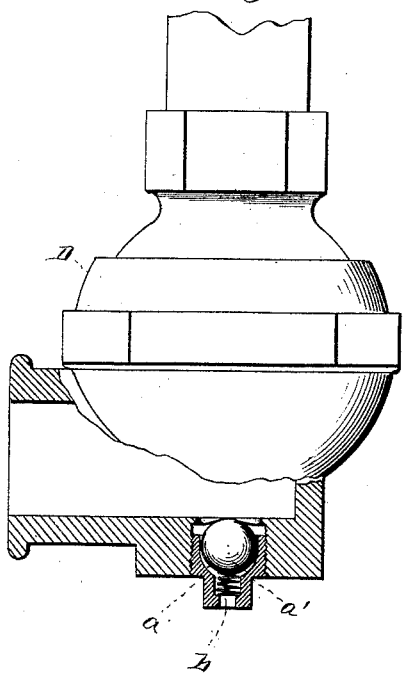
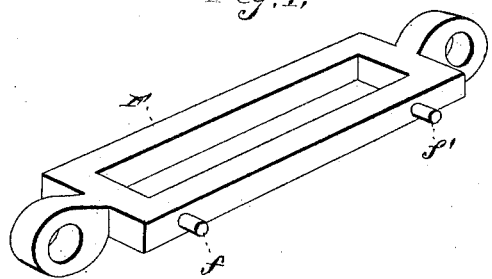
Witnesses
Chas L. Taylor
Phil C. Masi.
Inventor
T. W. Moran,
by E. W. Anderson
his Attorney
THE NORRIS PETERS CO., PHOTO-LITHO., WASHINGTON, D. C.

(Model.) 3 Sheets—Sheet 3.
T. W. MORAN.
STEAM COUPLING FOR STEAM HEATING RAILWAY CARS.
No. 465,873. Patented Dec. 29, 1891.
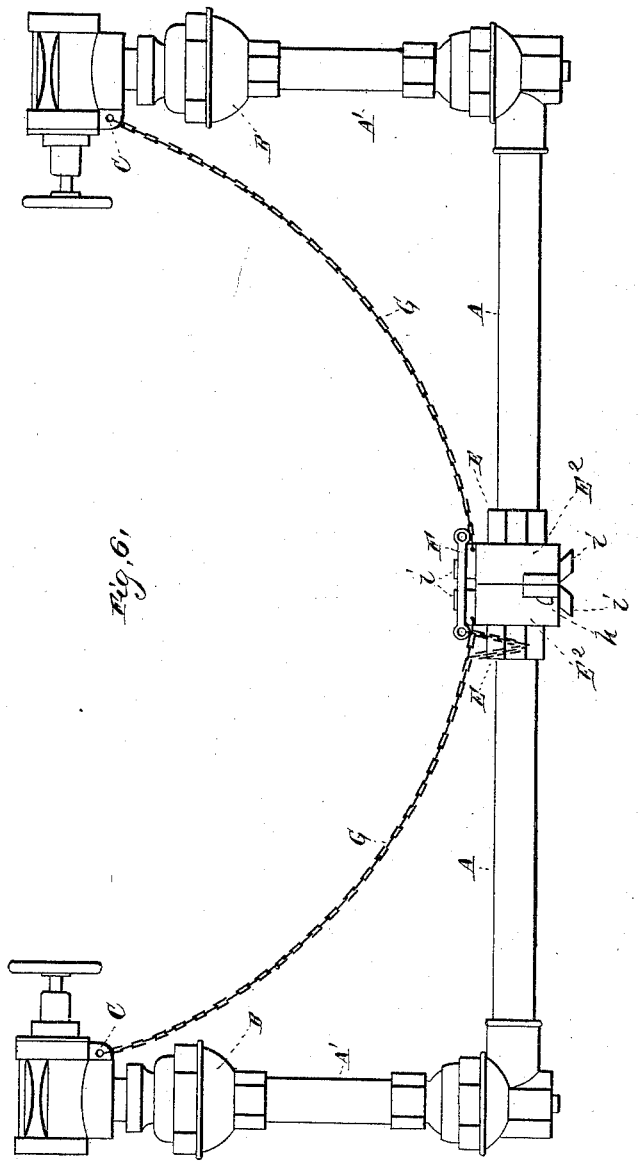
WITNESSES:
INVENTOR
T. W. Moran.
BY E. W. Anderson
his ATTORNEY.

UNITED STATES PATENT OFFICE.

THOMAS WILLIAM MORAN, OF LOUISVILLE, KENTUCKY.

STEAM-COUPLING FOR STEAM-HEATING RAILWAY-CARS.

SPECIFICATION forming part of Letters Patent No. 465,873, dated December 29, 1891.

Application filed August 16, 1890. Serial No. 362,195. (Model.)

*To all whom it may concern:*

Be it known that I, THOMAS WILLIAM MORAN, a citizen of the United States, residing at Louisville, in the county of Jefferson and State of Kentucky, have invented certain new and useful Improvements in Steam-Couplings for Steam-Heating Railway-Cars; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side view of my improved pipe or hose coupling for steam-heating purposes in railway-cars. Fig. 2 is an enlarged sectional view of the piston-joint thereof, and Fig. 3 is a side view of the same. Fig. 4 is an enlarged detached perspective view of one of the piston-joint links, and Fig. 5 is an enlarged partly-side and partly-sectional view of the angle-joint, parts also being broken away. Fig. 6 is a side elevation showing the two sections coupled together, the links on the under side being omitted.

This invention relates to certain improvements in pipe or hose couplings for steam-heating purposes in railway-cars; and it consists in the novel construction and combination of parts hereinafter disclosed.

In carrying out my invention I form the coupling of pipe or hose sections A A' in duplicate, one section A' connected by a universal joint B to a relief-valve C, adapted to be connected to the steam-heating pipe of the train, and the other pipe or hose section A connected by an angular joint D to the pipe or hose section A' and to one section or half of a piston-joint E.

The relief-valve C in construction is the same as the relief-valve in a former application of mine, patented January 13, 1891, No. 444,782, and is adapted to permit the escape of the steam remaining in the coupling when the valves are closed, thus relieving the pipe or hose sections of unnecessary pressure. The universal joint B, also the same in construction as the universal coupling-joint forming the subject-matter of a concurrent application of mine, Serial No. 341,526, is adapted to allow the escape of the water of condensation when the steam is cut off, and thus prevent the freezing of the same therein in cold weather.

The angle-joint D has screwed in a screw-threaded opening in its bottom an apertured hemispherical socket or plug $a$, forming a seat for the ball-valve $a'$, normally held from its seat in the socket $a$, when the steam-pressure is not on, by the action of a spring $b$, seated in the passage or aperture of said socket or plug and pressing on the valve $a'$, thus providing for drawing off the water of condensation.

The piston-joint E consists of meeting cylindric portions E', telescoping the corresponding chambers or boxes of the casings $E^2$, and each having an external circular flange $e$ at its middle moving or sliding in circumferential extensions $f$ of the boxes or chambers of said casings, the outer end walls or facings of which are formed of broad rings $g$, having screw-threaded connection with the walls of said boxes or chambers.

The pistons E' are each ground at both ends to form a perfectly steam-tight joint between them and whereby they can be used reversibly, thus providing for the subsequent use of one face or end when the other has become impaired or defective, and are also provided with suitable packing, forming the piston-head, so that when pressure is admitted the pistons are forced together, thereby making a steam-tight joint by the admission of inside pressure. The ends of the piston-inclosing casings $E^2$ are provided with opposite interlocking hooks or lugs and eyes $h\ h'$, and engaging additional outwardly-projecting lugs $i\ i$ on the said casings are opposite links F, serving as a safety-coupling attachment, in connection with the aforesaid interlocking lugs and eyes, constituting the primary coupling between the sections or casings of the piston-joint. The lugs $i\ i$ on the lower side of the casings $E^2$ are outwardly inclined or beveled to prevent their links from falling off. The links F, one or both, are provided with studs $f'$ to enable the same to serve as a wrench for engagement with apertures or sockets $f^2$ in the face of the rings $g$ to readily unscrew or remove the same. It will be observed that as long as the links F are engaged by the lugs $i$ the hooks or lugs $h$ cannot become disengaged from their retaining-eyes $h'$.

G G are slack-chains or other suitable medium connected at their inner ends to apertured lugs or ears on the relief-valve casings and at their opposite ends to the lugs $i$. It will be seen that when the cars separate the said chains become taut, and in so doing will raise the links off the lugs $i$. The coupling then being liberated at the top will open or part and hinge on the hook and eye. The outer parts of the bottom lugs $i$ come close together and the link thereon drops off by gravity, allowing the sections to come apart, the chains G holding them from falling in too close proximity to the ground.

The links $f$ on the under side may be dispensed with in general use, the hook and eye serving as sufficient coupling, but are provided in case said hook and eye become broken, when a coupling may be made by means of said link.

Having thus described this invention, what I claim, and desire to secure by Letters Patent, is—

1. In a coupling for steam-heating pipes for cars, the combination, with the piston-joint casings of the hose or pipe sections, said casings having the opposite interlocking hooks and eyes, the link-retaining lugs, and the facing-rings, of the link engaging the lugs on said casings, and the "slack" or tripping chains connected to the link-retaining lugs and to the opposite portion of the section and adapted to trip or disengage a link from the adjacent retaining-lug, substantially as set forth.

2. In a coupling for steam-heating pipes for cars, the piston-joint comprising the annular cylindric pistons, each having a central external ring-flange sliding or movable in its inclosing casing, and each piston having both ends adapted to serve as facings for the joint and reversible end for end, substantially as set forth.

3. In a coupling for steam-heating pipes, the combination, with the piston-joint casing and the link-engaging lugs on said casing and having studs thereon, adapted to engage sockets or apertures in facing-rings having a screw-threaded connection with said casings, of the pistons telescoping said casing and having suitable packing forming the piston-head, whereby an air or steam tight joint is formed by the admission of pressure, substantially as specified.

4. The combination, with the boxes or casings, of the reversible piston-sections ground at both ends and provided with suitable packing to form a steam-tight joint under pressure, substantially as specified.

5. In a coupling for steam-heating pipes for cars, the piston-joint comprising the annular cylindric pistons, each having a central external ring-flange sliding or movable in its inclosing casing, and each piston having both ends provided with suitable packing and adapted to serve as facings for the joint, whereby a steam-tight joint is formed under pressure, said pistons being reversible end for end, substantially as specified.

6. The combination, with the boxes or casings having the opposite interlocking hooks and eyes, of the annular cylindric pistons having both ends adapted to serve as facings for the joint and reversible end for end, substantially as specified.

7. The combination, with the boxes or casings having the opposite interlocking hooks and eyes and the link-retaining lugs, of the annular cylindric pistons, each having an external circular flange moving or sliding in circumferential extensions of the boxes or chambers of said cases and each having both ends adapted to serve as facings for the joint and reversible end for end, substantially as specified.

8. The box or casing having the opposite interlocking hooks and eyes, the link-retaining lugs, and the facing-rings for the boxes or chambers of said casings, in combination with the link and tripping chains therefor, substantially as specified.

In testimony whereof I affix my signature in presence of two witnesses.

THOMAS WILLIAM MORAN.

Witnesses:
 THOS. FINLEY,
 JOHN STANTON.